United States Patent [19]
Chang et al.

[11] 3,892,811
[45] July 1, 1975

[54] ORGANIC PEROXIDES AND METHOD THEREFOR

[75] Inventors: Yun Ger Chang; Philip S. Bailey, both of Austin, Tex.

[73] Assignee: Reichhold Chemicals, Inc., White Plains, N.Y.

[22] Filed: Apr. 18, 1974

[21] Appl. No.: 461,969

Related U.S. Application Data

[62] Division of Ser. No. 310,560, Nov. 29, 1972, Pat. No. 3,842,129, which is a division of Ser. No. 170,621, Aug. 10, 1971, Pat. No. 3,755,454, which is a division of Ser. No. 754,472, Aug. 21, 1968, abandoned.

[52] U.S. Cl. .................................... 260/593 R
[51] Int. Cl.² ................................. C07C 49/04
[58] Field of Search ......... 260/593 R, 610 R, 593 N

[56] References Cited
FOREIGN PATENTS OR APPLICATIONS
954,361   4/1964   United Kingdom............. 260/610 R

*Primary Examiner*—Howard T. Mars
*Assistant Examiner*—James H. Reamer

[57] ABSTRACT

This invention discloses a process of preparing organic peroxides, by reacting a hydroperoxide having the general formula R—O—O—H with an $\alpha,\beta$-unsaturated ketone. The $\alpha,\beta$-unsaturated ketone may have a straight chain structure or a cyclic structure. Reaction takes place at a temperature from about 0°C–80°C. in the presence of an acidic catalyst. The mole ratios of the components may vary from about 10:1 to 1:10.

2 Claims, No Drawings

ORGANIC PEROXIDES AND METHOD THEREFOR

This is a division of Ser. No. 310,560, filed Nov. 29, 1972 now U.S. Pat. No. 3,842,129 which in turn is a division of Ser. No. 170,621, filed Aug. 10, 1971, now U.S. Pat. No. 3,755,454, which in turn is a division of an earlier application, Ser. No. 754,472, filed Aug. 21, 1968, now abandoned.

This invention relates to novel peroxides and to method of preparing them. Particularly, this invention relates to peroxides obtained by the addition of hydroperoxides to $\alpha,\epsilon$-unsaturated carbonyl systems. More particularly, it is directed to novel peroxides produced by the addition reaction of hydroperoxides to $\alpha,\epsilon$-unsaturated ketones.

Some of these peroxides may be represented by the general formula

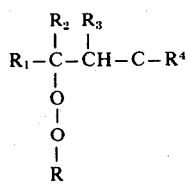

wherein, R is either an alkyl or an aralkyl group; $R_1$, $R_2$ and $R_3$ are the same or different members of the group consisting of hydrogen, alkyl, aralkyl, cycloalkyl, alkenyl, cycloalkenyl, aryl, alkaryl groups; $R_4$ is a member of the group consisting of alkyl, aralkyl, cycloalkyl, aryl, alkaryl, vinyl and substituted vinyl groups.

Some of these peroxides may be shown by one of the following two formulas:

and

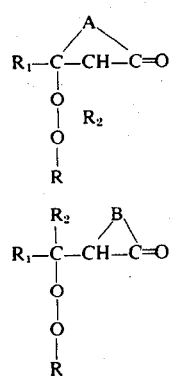

wherein, R, $R_1$ and $R_2$ have the same meanings as mentioned in the preceding paragraph; A is a hydrocarbon group containing two to three carbon atoms in the main chain, of which one terminal carbon atom connects with the carbonyl group and the other with the beta carbon atom of the $\alpha,\beta$-unsaturated ketones to form a ring, and may be an aliphatic, cycloaliphatic, substituted aliphatic, aromatic or substituted aromatic group; and B is a hydrocarbon group containing three to five carbon atoms in the main chain which forms a ring with the $\alpha,\beta$-unsaturated system by connecting the carbonyl group with one of its terminal carbon atoms and the alpha carbon atom with the ether, and may be an aliphatic, cycloaliphatic or substituted aliphatic group.

It has been known for a long time that $\alpha,\beta$-unsaturated carbonyl compounds could be converted into the corresponding epoxides by treatment with hydrogen peroxide in a basic medium. Similarly, it was reported in the literature that hydroperoxides could convert $\alpha,\beta$-unsaturated carbonyl compounds into the corresponding epoxides in the presence of a base. Harman, U.S. Pat. No. 2,508,256 (1950), reported that addition of hydroperoxide to an $\alpha,\beta$-unsaturated system containing a polar, meta-directing group, conjugate to the multiple bond, in a basic medium, producing a peroxide. The meta-directing groups include the CHO, COOH, COO(alkyl), COO(metal), CN, $CCl_3$, $NO_2$, $SO_3H$, $SO_2$, $CONH_2$, COCOOH, CO(alkyl) and the like groups. Later, Yang and Finnegan, J. Am. Chem. Soc., 80, 5845 (1958), found that the base-catalyzed reactions between hydroperoxides, and $\alpha,\beta$-unsaturated systems gave, instead of peroxides, only the corresponding epoxides, in yields of 50–90%. The reaction involves the addition of an alkyl peroxy anion to the beta carbon of the activated double bond and the elimination of an alkoxy anion with the formation of the epoxide. If the intermediate anion combines with a proton before the formation of epoxide occurs, a peroxy addition product is formed. It is apparent that in a basic medium, the intermediate anion does not have the chance to acquire a proton and, consequently, the final product is an epoxide. The mechanism of the base-catalyzed reaction can be shown as follows:

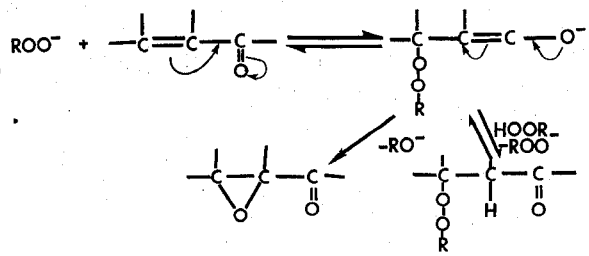

wherein R is either an alkyl or an aralkyl group.

It is an object of the present invention to produce peroxides by the addition of hydroperoxides to $\alpha,\beta$-unsaturated ketones.

It is another object of the present invention to provide some novel peroxides which are highly efficient polymerization initiators and cross-linking agents.

It is still another object of this invention to provide highly efficient methods for the preparation of such polymerization initiators and cross-linking agents.

These and other objects and advantages of the present invention will become more apparent from the following description.

It has been found that these objectives can be attained by reacting $\alpha,\beta$-unsaturated ketones with hydroperoxides in the presence of a catalyst. The reaction may take place in a solvent or without a solvent. It has been found that hydrocarbons such as pentane, hexane, heptane and benzene; alcohols such as isopropanol, butanol; ethers such as dioxane; esters such as butyl acetate, methyl butyrate; may be used as solvents. In the case where no solvent was used, the addition reaction became somewhat violent, as evidenced by the heat evolved.

In the present invention, the catalyst for the addition reaction of hydroperoxides to $\alpha,\beta$-unsaturated ketones is an acid, such as sulfuric acid, hydrochloric acid, perchloric acid, nitric acid or phosphoric acid. The use of acidic catalysts in the addition reaction is very significant, since it leads to the formation of peroxides as the final addition products, without producing epoxides. The amount of the catalyst used for the addition reaction may vary from a trace to about 30%, based on the total weight of the reactants described below. Usually, the amount ranging from about 5% to about 15%, based on the total weight of the reactants, is preferred.

In the reactions of the present invention, the mole ratio of $\alpha,\beta$-unsaturated ketone to hydroperoxide may vary widely, for example, from about 10:1 to 1:10. The preferred mole ratio of about $\alpha,\beta$-unsaturated ketone to hydroperoxide is about 1:1 to 1:2.

The reaction temperature of this invention may range from about 0°C. to about 80°C. However, the preferred reaction temperature is in the range of about 25°C. to about 35°C., on account of the outstanding results obtained therefrom. At relatively high temperatures, some side-reactions could take place. For example, when mesityl oxide was reacted with t-butyl hydroperoxide at 50°C. in the presence of sulfuric acid, the product was a mixture of about 50% of di-t-butyl peroxide and about 50% of the desired addition product.

In many cases, the active oxygen contents of the new peroxides of the present invention, as determined by the hydriodic acid-sodium thiosulfate titration method, were lower than the theoretical values. This is probably due to failure of the analytical method in the case of this particular type of peroxide.

The hydroperoxides employed as reactants in this invention may be represented by the general formula

R—O—O—H wherein, R is either an alkyl or an aralkyl group. Preferably, these are tertiary hydroperoxides, such as t-butyl hydroperoxide, t-amyl hydroperoxide and cumene hydroperoxide.

The $\alpha,\beta$-unsaturated ketones used in this invention may have a straight chain structure or a cyclic structure. They can be represented by one of the following formulas:

(1) 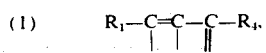

(2) 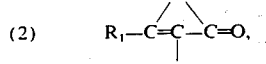

(3) 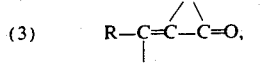

wherein, $R_1$, $R_2$, $R_3$, $R_4$, A and B are as previously described for the structures of the corresponding peroxides.

Because of the strong electron-withdrawing action of the carbonyl group, the olefinic double bond of $\alpha,\beta$-unsaturated ketone is electrophilic rather than nucleophilic. Consequently, in the reactions between $\alpha,\beta$-unsaturated ketones and hydroperoxides, in acidic medium, the initial attack on the olefinic carbon atom is nucleophilic. The mechanisms of these acid-catalyzed addition reactions are illustrated as follows:

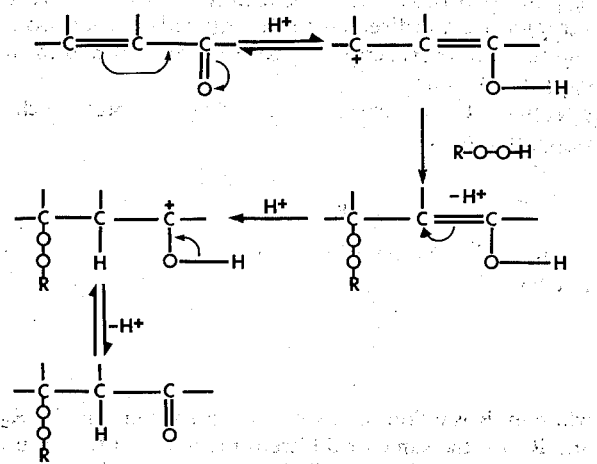

When hydrocarbon groups, instead of hydrogen atoms, are attached to the beta olefinic carbon atoms, the reaction between $\alpha,\beta$-unsaturated ketones and hydroperoxides does not go further than the addition of hydroperoxide to the olefinic double bond. The carbonyl group does not react with hydroperoxide since the infra-red spectra of the peroxidic addition products show a strong bond due to the non-conjugated carbonyl group. Presumably, the limited reaction is due to steric effects. The hydrocarbon group and the bulky alkylperoxy group attached to the beta carbon atom prevent the hydroperoxide from reacting with the carbonyl group. In case of phorone, not only the carbonyl group but also one of the two carbon-carbon double bonds did not react with hydroperoxide, presumably due to steric hindrance.

The new peroxides of this invention have been found to provide highly effective initiators in polymerization reactions, such as the polymerization of styrene, vinyl esters, alkyl methacrylates and the like. These peroxides have also been found to be good cross-linking agents for polyethylene, polypropylene and the like.

Some of the representative preparatory reactions are illustrated by the following equations:

EQUATION (1)

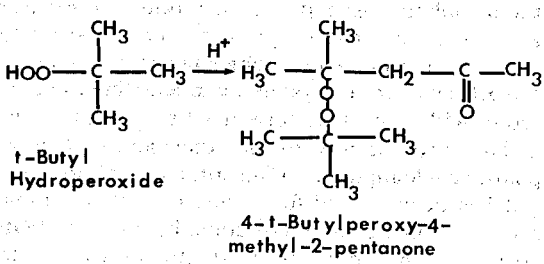

Mesityl Oxide    t-Butyl Hydroperoxide    4-t-Butylperoxy-4-methyl-2-pentanone

EQUATION (2)

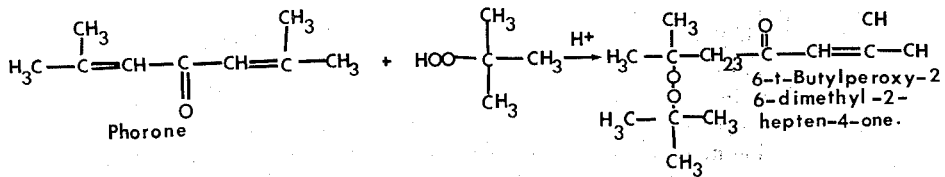

EQUATION (3)

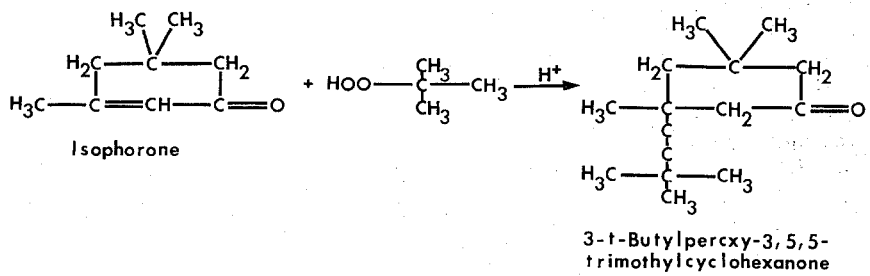

EQUATION (4)

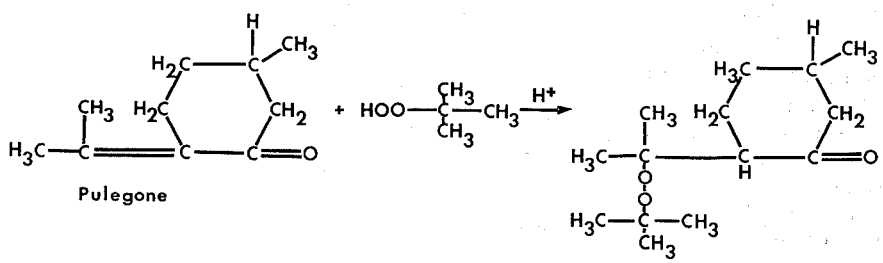

The following examples will illustrate the process of preparing the new peroxides of this invention. It is understood, however, that the examples are for purposes of illustrating the invention and are not intended as limitations thereto.

EXAMPLE 1

Preparation of 4-5-Butylperoxy-4-methyl-2-pentanone.

Forty grams (0.40 mole) of 90% t-butyl hydroperoxide, 28.00 grams (0.20 mole) of 70% sulfuric acid and 200 ml. of hexane were mixed together in a beaker. To the resulting mixture, at room temperature, was slowly added 19.63 grams (0.20 mole) of mesityl oxide, with agitation. The reaction mixture was stirred at room temperature for 5 hours longer and then allowed to stand overnight.

The organic layer was separated, washed five times with 10-ml. portions of 5% potassium hydroxide solution and three times with water and finally dried over anhydrous magnesium sulfate. Filtration and removal of solvent under reduced pressure using a water aspirator and a rotating evaporator left a light-brown liquid weighing 23.80 grams. This indicated a yield of 64.40%, based on the amount of mesityl oxide used for the reaction. The crude product contained no hydroperoxide shown by lead tetra-acetate test, and had a 7.10% active oxygen content. After purification by two distillations at 55°C. and 0.7 mm., the colorless liquid product contained 5.74% active oxygen (theoretically, 8.50%) determined by hydriodic acid-sodium thiosulfate titration. Other constants obtained for this new peroxide were $d_4^{25} 0.9370$, $\eta_D^{25} 1.4288$, MR (calcd.) 52.64, MR (obsd.) 51.83.

Analysis — Calcd. for $C_{16}H_{20}O_3$: C, 63.79; H, 10.71; O, 25.50; Molecular weight 188. Found: C, 63.80; H, 10.39; O, 26.06; Molecular weight 234.

The infra-red spectrum of this compound showed a very strong and sharp band at 1700 cm$^{-1}$ due to non-conjugated carbonyl groups, a very strong band at 1360 cm$^{-1}$ with a shoulder at 1372 cm$^{-1}$ due to t-butyl groups and a strong band at 870 cm$^{-1}$ representing the peroxide groups.

On the basis of the analytical data and the information obtained from the infra-red spectrum, the structure of this new peroxide is assigned as follows.

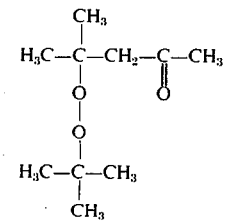

EXAMPLE 2

The procedure of Example 1 was repeated without using an organic solvent. A cooling bath was employed to keep the reaction temperature at 25°C. to 35°C. The product was extracted with ether. The ether solution was washed with water and dried over anhydrous magnesium sulfate. The final product was identified as 4-t-butylperoxy-4-methyl-2-pentanone.

EXAMPLE 3

Preparation of 4-t-Amylperoxy-4-methyl-2-pentanone.

In a beaker, 10.4 grams (0.1 mole) of t-amyl hydroperoxide and 14.0 grams (0.1 mole) of 70% sulfuric acid were mixed with 100 ml. of hexane. to the resulting mixture was added 9.8 grams (0.1 mole) of mesityl oxide, at room temperature, with stirring. The reaction mixture was stirred at room temperature for 5 hours and then allowed to stand overnight. The organic layer was separated and washed 5 times with 10-ml. portions of 5% sodium hydroxide solution and twice with water. Finally, it was dried over anhydrous magnesium sulfate. Filtration and removal of solvent under reduced pressure gave a liquid peroxidic product. It was identified as the addition product, 4-t-amylperoxy-4-methyl-2-pentanone.

EXAMPLE 4

Preparation of 4-Cumylperoxy-4-methyl-2-pentanone.

To 100 ml. of hexane were added 15.2 grams (0.1 mole) of cumene hydroperoxide and 14.0 grams (0.1 mole) of 70% sulfuric acid. To the resulting mixture was added 9.8 grams (0.1 mole) of mesityl oxide, at room temperature, with agitation. The reaction mixture was stirred, at room temperature, for 5 hours and then allowed to stand overnight. The organic layer was separated and washed 5 times with 10-ml. portions of 5% sodium hydroxide solution and twice with water. After being dried over anhydrous magnesium sulfate, the solvent was removed under reduced pressure. A liquid was obtained and identified as the addition product, 4-cumylperoxy-4-methyl-2-pentanone.

EXAMPLE 5

Preparation of 6-t-Butylperoxy-2,6-dimethyl-2-hepten-4-one.

In a 500-ml. round-bottom flask, 25.0 grams (0.25 mole) of 90% t-butyl hydroperoxide, 14.0 grams (0.1 mole) of 70% sulfuric acid and 200 ml. of hexane were mixed together. To the resulting mixture was added 9.4 grams (0.068 mole) of phorone, at room temperature, with stirring. The reaction mixture was stirred at room temperature for 24 hours and at 50°C. for 24 hours longer. The mixture was diluted with 30 ml. of water. The organic layer was separated, washed 10 times with 10-ml. portions of 5% potassium hydroxide solution and 3 times with 20-ml. portions of water, and finally dried over anhydrous magnesium sulfate. Filtration and removal of solvent under reduced pressure left a brown liquid weighing 16.0 grams, indicating a 100% yield based on the amount of phorone used for the reaction. The crude product contained no hydroperoxide shown by lead tetra-acetate test, and had a 7.81% active oxygen content determined by hydriodic acid-sodium thiosulfate method. After purification by distillations at 78°–79°C. and 1.5 mm., the pale yellow liquid contained 6.40% active oxygen (theoretically 7.01%), and had $d_4^{25}$ 0.9950, $\eta_D^{25}$ 1.4494.

Analysis. — Calcd. for $C_{13}H_{24}O_3$: C, 68.39; H, 10.59; O, 21.02; Molecular weight 228. Found: C, 67.64; H, 10.29; O, 21.85; Molecular weight 240.

The infra-red spectrum of this compound showed a band at 1672 cm$^{-1}$ due to conjugated carbonyl groups, a strong band at 1600 cm$^{-1}$ due to >C=CH— groups, a strong band at 1360 cm$^{-1}$ with a shoulder at 1373 cm$^{-1}$ indicating t-butyl groups, and a strong band at 864 cm$^{-1}$ representing peroxide groups.

Based on these data, this new compound is the peroxidic addition product having the following structure.

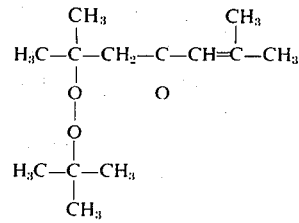

EXAMPLE 6

Preparation of 6-t-Amylperoxy-2,6-dimethyl-2-hepten-4-one.

To a mixture of 4.86 grams (0.045 mole) of t-amyl hydroperoxide, 4.20 grams (0.03 mole) of 70% sulfuric acid and 50 ml. of hexane, was added 4.14 grams (0.03 mole) of phorone, at room temperature with agitation. The reaction mixture was stirred at 40°–50°C. for 48 hours, and then diluted with 10 ml. of water. The organic layer was separated, washed 10 times with 5-ml. portions of 5% sodium hydroxide solution and 3 times with 10-ml. portions of water, and finally dried over anhydrous magnesium sulfate. Filtration and removal of low-boiling materials under reduced pressure gave a light-brown liquid, identified as the addition product 6-t-amylperoxy-2,6-dimethyl-2-hepten-4-one.

EXAMPLE 7

Preparation of 6-Cumylperoxy-2,6-dimethyl-2-hepten-4-one.

To a mixture of 6.84 grams (0.045 mole) of cumene hydroperoxide, 4.20 grams (0.03 mole) of 70% sulfuric acid and 50 ml. of hexane, was added 4.14 grams (0.03 mole) of phorone, at room temperature, with stirring. The reaction mixture was stirred at 40°–50°C. for 48 hours. It was diluted with 10 ml. of water. The organic layer was separated, washed 10 times with 5-ml. portions of 5% sodium hydroxide solution and 3 times with 10-ml. portions of water, and then dried over anhydrous magnesium sulfate. Filtration and removal of low-boiling materials under reduced pressure left a light-brown liquid, identified as the addition product 6-cumylperoxy-2,6-dimethyl-2-hepten-4-one.

EXAMPLE 8

Preparation of 3-t-Butylperoxy-3,5,5-trimethylcyclohexanone.

To a mixture of 30.0 grams (0.3 mole) of 90% t-butyl hydroperoxide, 14.0 grams (0.1 mole) of 70% sulfuric acid and 200 ml. of hexane, was added 13.8 grams (0.1 mole) of isophorone, at room temperature, with agitation. The reaction mixture was stirred, at room temperature, for 5 hours and then allowed to stand overnight. The organic layer was separated, washed twice with 50-ml. portions of saturated sodium bicarbonate solution and twice with water, and finally dried over anhydrous magnesium sulfate. Filtration and removal of low-boiling materials under reduced pressure gave a light-brown liquid, weighing 23.4 grams. The product was purified by 5 distillations at 65°–67°C. and 1.0 mm. The purified liquid contained no hydroperoxide and had a refractive index $\eta_D^{25} 1.4430$. The infra-red spectrum of this compound showed a strong band at 1725 cm$^{-1}$ due to non-conjugated cyclic carbonyl groups; a strong band at 1370 cm$^{-1}$ due to C—CH$_3$ and C(CH$_3$)$_2$ groups; and a strong band at 878 cm$^{-1}$ due to peroxide groups. The active oxygen content of this compound determined by hydriodic acid-sodium thiosulfate titration method seemed higher than the theoretical value.

According to these data, it is reasonable to assign the following structure for this compound.

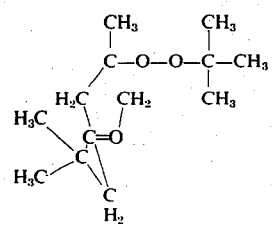

EXAMPLE 9

The preparation described in Example 8 was carried out without using organic solvent. The isophorone was mixed with the t-butyl hydroperoxide. To the resulting mixture was slowly added the sulfuric acid at room temperature. The reaction mixture was stirred for thirty hours while the temperature was kept at 25°–30°C., using a cold water bath. The reaction mixture was diluted with water. The organic layer was separated, washed with sodium bicarbonate solution and with water, and finally dried over anhydrous magnesium sulfate. The final product was identified as 3-t-butylperoxy-3,5,5-trimethyl-cyclohexanone.

EXAMPLE 10

Preparation of
3-5-Amylperoxy-3,5,5-trimethylcyclohexanone.

To a mixture of 6.24 grams (0.06 mole) of t-amyl hydroperoxide, 4.20 grams (0.03 mole) of 70% sulfuric acid and 30 ml. of hexane, was added 4.14 grams (0.03 mole) of isophorone, at room temperature, with stirring. The reaction mixture was stirred at room temperature for 5 hours, and then allowed to stand overnight. The organic layer was separated, washed twice with 10-ml. portions of saturated sodium bicarbonate solution and twice with 10-ml. portions of water, and finally dried over anhydrous magnesium sulfate. Filtration and removal of low-boiling materials under reduced pressure left a liquid product, identified as the addition product, 3-t-amylperoxy-3,5,5-trimethyl-cyclohexanone.

EXAMPLE 11

Preparation of
3-Cumylperoxy-3,5,5-trimethylcyclohexanone.

To a mixture of 9.12 grams (0.06 mole) of cumene hydroperoxide, 4.20 grams (0.03 mole) of 70% sulfuric acid, and 40 ml. of hexane was added 4.14 grams (0.03 mole) of isophorone, at room temperature, with agitation. The reaction mixture was stirred at room temperature for 5 hours, and then allowed to stand overnight. The organic layer was separated. It was washed twice with 10-ml. portions of saturated sodium bicarbonate solution and twice with water, and finally dried over anhydrous magnesium sulfate. Filtration and removal of low-boiling materials under reduced pressure gave a liquid product, identified as the addition product, 3-cumylperoxy-3,5,5-trimethylcyclohexanone.

EXAMPLE 12

Preparation of
2-(1-t-butylperoxy-1-methylethyl)-5-methylcyclohexanone.

To a mixture of 6.0 grams (0.06 mole) of 90% t-butyl hydroperoxide, 4.20 grams (0.03 mole) of 70% sulfuric acid, and 40 ml. of hexane, was added 4.56 grams (0.03 mole) of pulegone, at room temperature, with stirring. The reaction mixture was stirred, at room temperature, for 5 hours and then allowed to stand overnight. The organic layer was separated, washed twice with 20-ml. portions of saturated sodium bicarbonate solution and twice with 20-ml. portions of water, and finally dried over anhydrous magnesium sulfate. Filtration and removal of low-boiling materials under reduced pressure left a liquid product, identified as the addition product, having the following structure.

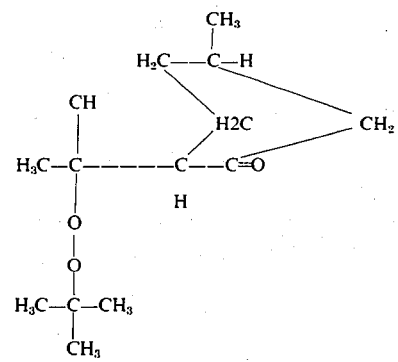

The invention in its broader apsects is not limited to the specific steps, methods, and compositions described, but departures may be made therefrom within the scope of the accompanying claims without departing from the principles of the invention and without sacrificing its chief advantages.

What is claimed is:

1. An organic peroxide; namely, 4-t-butylperoxy-4-methyl-2-pentanone.

2. An organic peroxide; namely 4-t-amylperoxy-4-methyl-2-pentanone.

* * * * *

Notice of Adverse Decision in Interference

In Interference No. 99,226, involving Patent No. 3,892,811, Y. G. Chang and P. S. Bailey, ORGANIC PEROXIDES AND METHOD THEREFOR, final judgment adverse to the patentees was rendered Nov. 4, 1976, as to claims 1 and 2.

[*Official Gazette March 22, 1977.*]